(12) United States Patent
Takahashi et al.

(10) Patent No.: US 7,888,828 B2
(45) Date of Patent: Feb. 15, 2011

(54) STARTER GENERATOR

(75) Inventors: Masakatsu Takahashi, Numazu (JP); Kazuyoshi Kishibata, Numazu (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 44 days.

(21) Appl. No.: 12/464,983

(22) Filed: May 13, 2009

(65) Prior Publication Data

US 2009/0284087 A1 Nov. 19, 2009

(30) Foreign Application Priority Data

May 14, 2008 (JP) ............................ 2008-126817

(51) Int. Cl.
*H02K 9/06* (2006.01)
(52) U.S. Cl. .......................... 310/54; 310/58
(58) Field of Classification Search .................. 310/52, 310/54, 57, 58, 62
See application file for complete search history.

(56) References Cited

U.S. PATENT DOCUMENTS

| | | | | |
|---|---|---|---|---|
| 2,414,532 A | * | 1/1947 | Johns et al. ..................... | 310/57 |
| 4,870,307 A | * | 9/1989 | Kitamura et al. ............... | 310/54 |
| 4,980,588 A | * | 12/1990 | Ogawa ........................ | 310/68 D |
| 5,783,888 A | * | 7/1998 | Yamano ........................ | 310/91 |
| 5,836,270 A | * | 11/1998 | Aoki et al. .................. | 123/41.31 |
| 5,925,947 A | * | 7/1999 | Kajiwara et al. ............... | 310/64 |
| 6,160,332 A | * | 12/2000 | Tsuruhara ..................... | 310/54 |
| 6,392,311 B2 | | 5/2002 | Inaba et al. | |
| 6,815,849 B2 | * | 11/2004 | Serizawa et al. .............. | 310/62 |
| 6,864,604 B2 | * | 3/2005 | Nakano et al. ................ | 310/57 |
| 7,342,333 B2 | * | 3/2008 | Umezu ....................... | 310/67 R |
| 2002/0117935 A1 | | 8/2002 | Kanazawa et al. | |

* cited by examiner

*Primary Examiner*—Dang D Le
(74) *Attorney, Agent, or Firm*—Pearne & Gordon LLP

(57) ABSTRACT

A starter generator which includes a rotor having a cuplike-shaped rotor yoke and magnets attached to an inner periphery of the rotor yoke, a stator mounted on a stator bracket and a protecting cover covering said rotor and stator, in which a hermetically sealed casing is constituted by said protecting cover and stator bracket, wherein a plurality of fans are provided on an outer surface of a bottom wall portion of said rotor yoke, a plurality of vent holes are provided through said bottom wall portion, said plurality of fans constitute a centrifugal fan which draws out air inside the rotor yoke through said vent holes and sends the air to an outer periphery of the rotor yoke, and a guide surface which guides the air sent to the outer periphery of the rotor yoke to a space inside the rotor yoke is provided on the stator bracket.

12 Claims, 6 Drawing Sheets

STARTER GENERATOR

TECHNICAL FIELD OF THE INVENTION

The present invention relates to a starter generator which operates as a starter motor at start of the engine and operates as a magneto generator after the start of the engine.

PRIOR ART OF THE INVENTION

It is proposed that a starter generator is mounted on a vehicle driven by an engine. The starter generator is a rotating electric machine which combines a starter motor which drives a crankshaft of the engine at start of the engine with a generator which provides electric power to various electric loads after the starting operation is completed.

As disclosed in U.S. Pat. No. 6,392,311, the starter generator comprises: a rotor which includes a field system consisting of permanent magnets and is mounted on a crankshaft of the engine; a stator having a multi-phase armature coil; a magnetic sensor which outputs signals including rotational angle position information of the rotor; and a drive control system which flow a drive current to the armature coil while an excitation pattern of the armature coil is switched in accordance with the detected output of the magnetic sensor, so as to operate the starter generator as a brushless motor at the start of the engine. As the magnetic sensor, for example, a Hall sensor is used. The Hall sensor is placed at each detecting position set with respect to each phase of the armature coil. The Hall sensor detects polarity of the magnetic poles of the rotor at the detecting position and outputs a signal including an information of rotational angle position of the rotor.

The drive control system determines a phase to be excited and a polarity of a current fed to each phase coil of the armature coil in accordance with the rotational angle position information detected by the magnetic sensor. The drive control system operates the starter generator as a brushless motor by supplying a current having the determined polarity to each phase coil of the armature coil and rotates a crankshaft of the engine in a starting direction. After the start operation of the engine is completed, the starter generator is driven by the engine to operate as a magneto generator and supplies electric power to various loads such as an ignition system for engine and a fuel injection system.

When a starter generator is mounted on vehicles driven by an engine, especially ATVs (All terrain vehicles) which drive on hill, dale or rough ground, it is preferable to cover the starter generator with a protecting cover in liquid-tight manner in order to protect the starter generator from liquid or obstruction.

However, since it is necessary for the starter generator to generate high torque as a motor at the start of the engine and generate a high output as a generator after the starting operation of the engine is completed, a large amount of heat is kept generating from an armature coil, which causes a rise in temperature of the armature coil.

Therefore, when the starter generator is covered with the protecting cover in liquid-tight manner, the temperature inside of the cover increases largely and possibly exceeds an operating temperature limit of the magnetic sensor. In order to make covering of the starter generator with the protecting cover possible, it is necessary to efficiently perform a cooling operation of the starter generator inside of the protecting cover.

In a generator for vehicle in which a generator body is covered with a protecting cover in liquid-tight manner, as shown in USSN2002/117,935, it is proposed that a cooling water circulating passage is formed inside of a side wall portion of the protecting cover and a stator of the generator is arranged so that an outer peripheral surface of the armature core of the stator contacts with an inner surface of the side wall portion of the protecting cover. With such a construction, since heat being generated on the armature coil can be transferred to the side wall portion of the protecting cover which is cooled by the cooling water, the armature coil can be cooled.

In case where the rotor is arranged inside of the stator, since the outer surface of the armature core of the stator can be arranged so as to contact with the side wall of the protecting cover as shown in USSN2002/117,935, heat exchange can be performed between the armature core and the side wall of the protecting cover so that the armature coil can be cooled efficiently.

However, in case of using a starter generator in which a stator is arranged inside of a rotor, the cooling of the armature coil cannot be performed efficiently even if a cooling passage is formed inside of a side wall portion of a protecting cover, as disclosed in USSN2002/117,935, since an outer surface of an armature core cannot be contacted with the side wall of the protecting cover.

SUMMARY OF THE INVENTION

An object of the present invention is to provide a starter generator in which a rotor and a stator being arranged inside of the rotor are covered with a protecting cover in liquid-tight manner so as to perform water-proofing and mechanical protection of the rotor and stator, without preventing the cooling of an armature coil.

The present invention is applied to a starter generator which operates as a brushless motor at start of the engine to rotatably drive a crankshaft of the engine in order to start the engine, and is driven by the engine after the starting operation of the engine is completed to operate as a magneto generator.

In one aspect of the present invention, a starter generator comprises: a rotor which includes a rotor yoke having a peripheral wall portion and a bottom wall portion closing one axial end of the peripheral wall portion, and permanent magnets being attached on an inner peripheral of the peripheral wall portion of the rotor yoke, and in which a boss portion to be connected to a crankshaft of said engine is provided at a center of the bottom wall portion of the rotor yoke; a stator bracket to be fixed to a case of the engine; a stator having an armature core and a multi-phase armature coil wound around said armature core and being arranged inside of the rotor, in which the armature core is fixed to the stator bracket; and a protective cover having an end wall portion which is opposed to the bottom wall portion of the rotor yoke and a cylindrical side wall portion surrounding said peripheral wall portion of the rotor yoke. The protective cover is fixed to the engine so as to be sealed in liquid-tight manner with respect to the engine and a rotor/stator containing space for containing said rotor and stator is formed within said protective cover.

In the present invention, a plurality of fans are formed on an outer surface of a portion close to the outer periphery of the bottom wall portion of the rotor yoke. The fans are arranged so as to be arrayed in circumferential direction of the rotor yoke. Each vent hole which penetrates the bottom wall portion is formed at a position adjacent to a fan, respectively. The plurality of fans constitute a centrifugal fan for leading air inside of the rotor yoke out through the vent holes to send the air to the outer peripheral side of the rotor yoke when the rotor rotates. Also, it is provided a guide surface on the stator bracket, which guides, into the inside of the rotor yoke, the air sent to the outer peripheral side of the rotor yoke by the centrifugal fan and flowed to the stator bracket side through a gap between the side wall portion of the protective cover and the peripheral wall portion of the rotor yoke.

As constituted above, it is possible to constantly generate, in the protective cover, air flow which is led from the inside of the rotor yoke through the vent holes and sent to the outer peripheral side of the rotor yoke and returned to the inside of the rotor yoke through the gap between the rotor yoke and the protective cover and through the opening portion of the rotor yoke. Therefore, after the air which temperature is increased by absorbing heat of the armature coil in the rotor yoke is led outside of the rotor yoke and cooled by contacting with the end wall and the side wall portion of the protective cover, the air is returned inside of the rotor yoke so as to absorb heat of the armature coil again. Thus, cooling of the armature coil can be efficiently performed, and waterproofing property and mechanical protection of the starter generator body having a rotor and a stator being arranged inside of the rotor can be accomplished by housing the starter generator body in the protecting cover in liquid-tight manner without preventing the cooling of the armature coil.

In another aspect of the present invention, a stator bracket includes: a base plate portion having a plate surface being orthogonal to an axis of the rotor and an outer diameter which is larger than a peripheral wall portion of a rotor yoke, in which a hole concentrically surrounding a boss portion of the rotor yoke is provided at the center of the base plate; an annular inner peripheral wall portion which protrudes from an inner peripheral portion of the base plate to the rotor side and surrounds the boss portion of the rotor yoke; an outer peripheral wall portion which protrudes from an outer peripheral portion of the base plate to the rotor side at an outward position of the peripheral wall portion of the rotor yoke. The base plate is constituted so as to be connected, in liquid tight manner, to an end surface of an annular peripheral wall portion being provided on a case of the engine for mounting the stator. The stator is fixed to the inner peripheral wall portion of the stator bracket, and the protecting cover is fixed to the stator bracket so that an open end of the side wall portion of the protecting cover is abutted to the end surface of the outer peripheral wall portion of the stator bracket. In this case, the guide surface, which guides air flowing to the stator bracket side through a gap between the side wall portion of the protecting cover and the peripheral wall portion of the rotor yoke into inside of the rotor yoke, is formed at a boundary portion between the outer peripheral wall portion and the base plate of the stator bracket.

In another aspect of the present invention, a large number of protrusions or heat radiation fins are formed on an inner surface of an end wall of the protecting cover and an inner periphery of the side wall portion of the protecting cover.

When the large number of protrusions and heat radiation fins are formed on the inner surface of the end wall and the inner periphery of the side wall of the protecting cover as aforementioned, it is possible to increase contact area between air flowing through the vent hole of the rotor yoke and the end wall of the protecting cover and increase contact area between air, which flows through a gap between the side wall portion of the protecting cover and the peripheral wall portion of the rotor yoke, and the side wall portion of the protecting cover. Therefore, cooling of air being led from inside of the rotor yoke can be expedited to increase cooling efficiency of the starter generator.

In another aspect of the present invention, a water cover is provided so as to cover at least a part of the end wall of the protecting cover and at least a part of the side wall portion of the protecting cover. Between the water cover and the protecting cover, a cooling water passage in which cooling water of the engine is passed is formed so as to lead cooling water of the engine into the cooling water passage.

As constituted above, since the protecting cover can be positively cooled by cooling water, it is possible to cool the starter generator efficiently.

In case that the water cover is provided so as to cover at least a part of the protecting cover from outside and that the cooling water passage is formed between the water cover and the protecting cover, it is preferable to form a large number of protrusions or heat radiation fins on an inner surface of the end wall of the protecting cover which contacts to the cooling water passage and on an inner periphery of the side wall portion of the protecting cover which contacts to the cooling water passage.

With the above constitutions, since heat exchange being performed between cooling water and air flowing between the rotor yoke and the protecting cover is enhanced to cause cooling of the starter generator to be efficiently performed, it is possible to contain a starter generator body having a rotor and a stator being arranged inside of the rotor, in the protecting cover in liquid-tight manner to make water proofing and mechanical protection of the starter generator body possible, without interfering the cooling of the armature coil.

In another aspect of the present invention, a water cover is mounted so as to cover at least a part of an end wall of a protecting cover and at least a part of a side wall portion of the protecting cover; a cooling water passage to which cooling water of an engine is led is formed between the water cover and the protecting cover; a position detecting magnet, magnetized so that a plurality of magnetic poles are circumferentially arranged at equal angular intervals, are attached on an outer surface of a bottom wall portion of the rotor yoke; and a magnetic sensor is attached so as to be thermally coupled to an inner surface of the end wall of the protecting cover. The magnetic sensor detects polarity of magnetic poles of the position detecting magnets and outputs signals including rotational angle position information of the rotor. Also, there is provided a drive control device which flows drive current to an armature coil according to exciting pattern being decided based on the rotational angle position information detected by the magnetic sensor for driving the starter generator as a brushless motor at the start of the engine.

In this case, it is preferable to form a large amount of protrusions or heat radiation fins on an inner surface of the end wall of the protecting cover which contacts to the cooling water passage and on the inner periphery of the side wall portion of the protecting cover which contacts to the cooling water passage, respectively.

As aforementioned, when the magnetic sensor which is necessary for operating the starter generator as the brushless motor at the start of the engine is thermally coupled to the end wall of the protecting cover contacting to the cooling water passage, it is possible to cool the magnetic sensor effectively, thus certainly preventing temperature of the magnetic sensor from exceeding an usable temperature range.

It is preferable that the above-described magnetic sensor comprises a metal base plate and Hall elements attached to the metal base plate, and the metal base plate is thermally coupled to the end wall of the protecting cover which contacts to the cooling water passage.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF THE PREFERRED EMBODIMENTS

Figure 1:
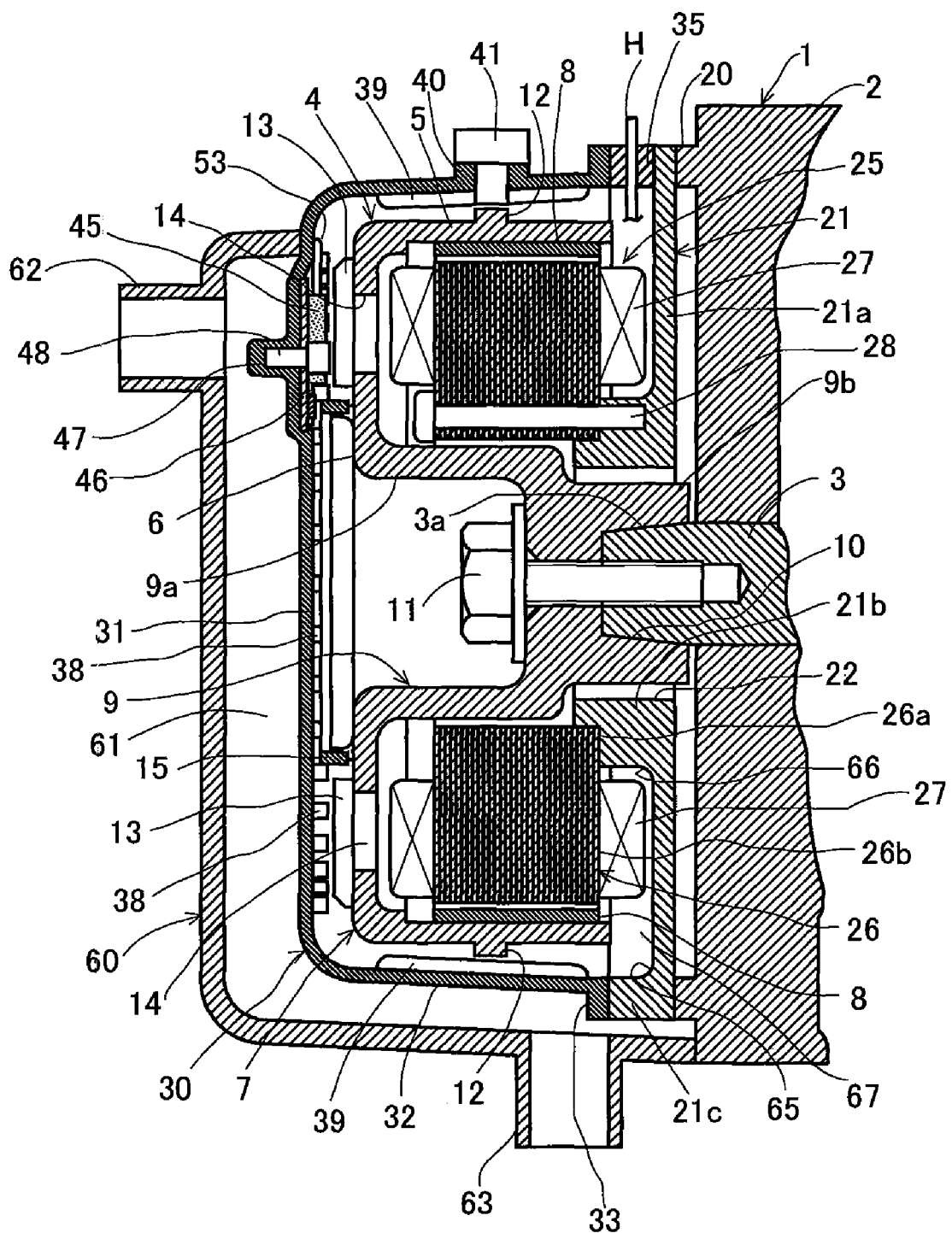
FIG. 1 is a vertical sectional view showing a starter generator according to the first embodiment of the present invention.

Now, preferred embodiments of the present invention will be described in detail with reference to the drawings. FIGS. 1 to 6 show a first embodiment of the present invention applied to a starter generator according to the present invention. In FIG. 1, a reference numeral 1 denotes an engine, 2 denotes a crank case of the engine, 3 denotes a crankshaft which is rotatably supported by the crank case. On the crankshaft 3, a rotor 4 is attached. The shown rotor 4 comprises a cup-shaped rotor yoke 7 integrally-having a peripheral wall portion 5 and a bottom wall portion 6 which closes one axial end of the peripheral wall portion 5, and a plurality of arc-shaped permanent magnets 8 which are arranged on an inner periphery of the peripheral wall portion 5 of the rotor yoke 7 at equal angular intervals and are bonded to the peripheral wall portion.

In the center of the bottom wall portion 6 of the rotor yoke, it is integrally provided a boss 9 consisting of a large-diameter cylindrical portion 9a being protruded toward inside of the rotor yoke and a small-diameter columnar extended portion 9b extending so as to protrude from a bottom of the cylindrical portion 9a to a position beyond an opening end of the peripheral wall portion 5. On an axial core of the extended portion 9b of the boss 9, it is provided a tapered hole 10 to which a tapered portion 3a formed on a tip of the crankshaft 3 of the engine is fitted. A bolt 11 penetrating the axial core of the extended portion 9b of the boss 9 is screwed to a threaded hole provided on the axial core of the crankshaft 3, which cause the rotor 4 to be fasten onto the crankshaft 3. The rotor yoke 7 is formed by ferromagnetic materials such as iron.

The plurality of permanent magnets 8 mounted on the inner periphery of the peripheral wall portion 5 of the rotor 4 are magnetized in radial direction of the rotor so that N-poles and S-poles are alternatively arranged in circumferential direction of the rotor 4, and magnetic field of the rotor is constructed by these magnets. In this preferred embodiment, rare-earth magnets are used as the permanent magnets 8.

In order to obtain rotational angle information of the crankshaft of the engine, inducers 12 consisting of arc-shaped protrusions extending in circumferential direction of the rotor are formed on an outer periphery of the peripheral wall portion 5 of the rotor 4. In the shown example, a pair of inducers is symmetrically positioned so as to be apart 180-degree from each other.

Figure 2:
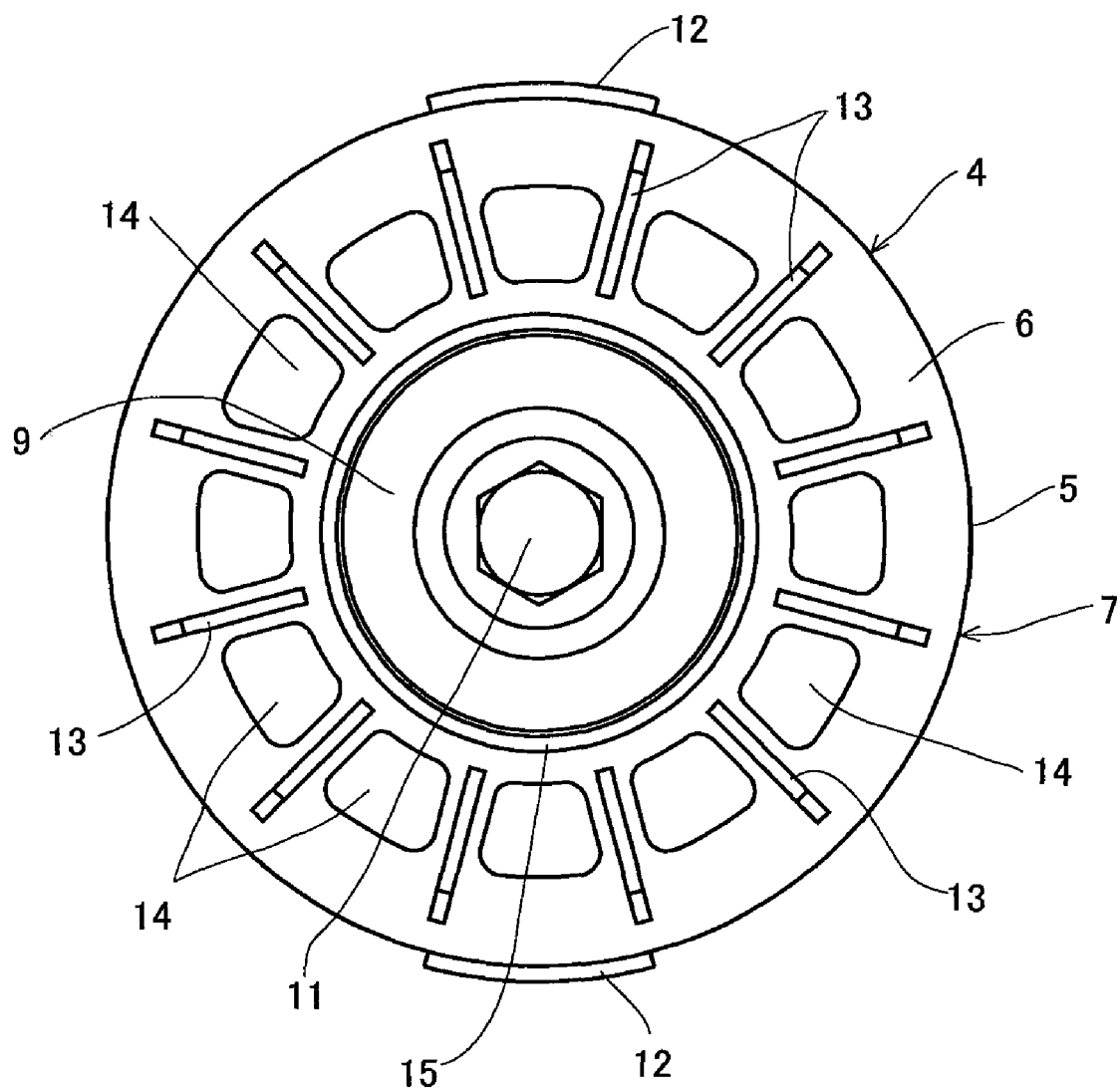
FIG. 2 is a front view showing the starter generator, in which a protecting cover is removed, in the first embodiment.
Figure 3:
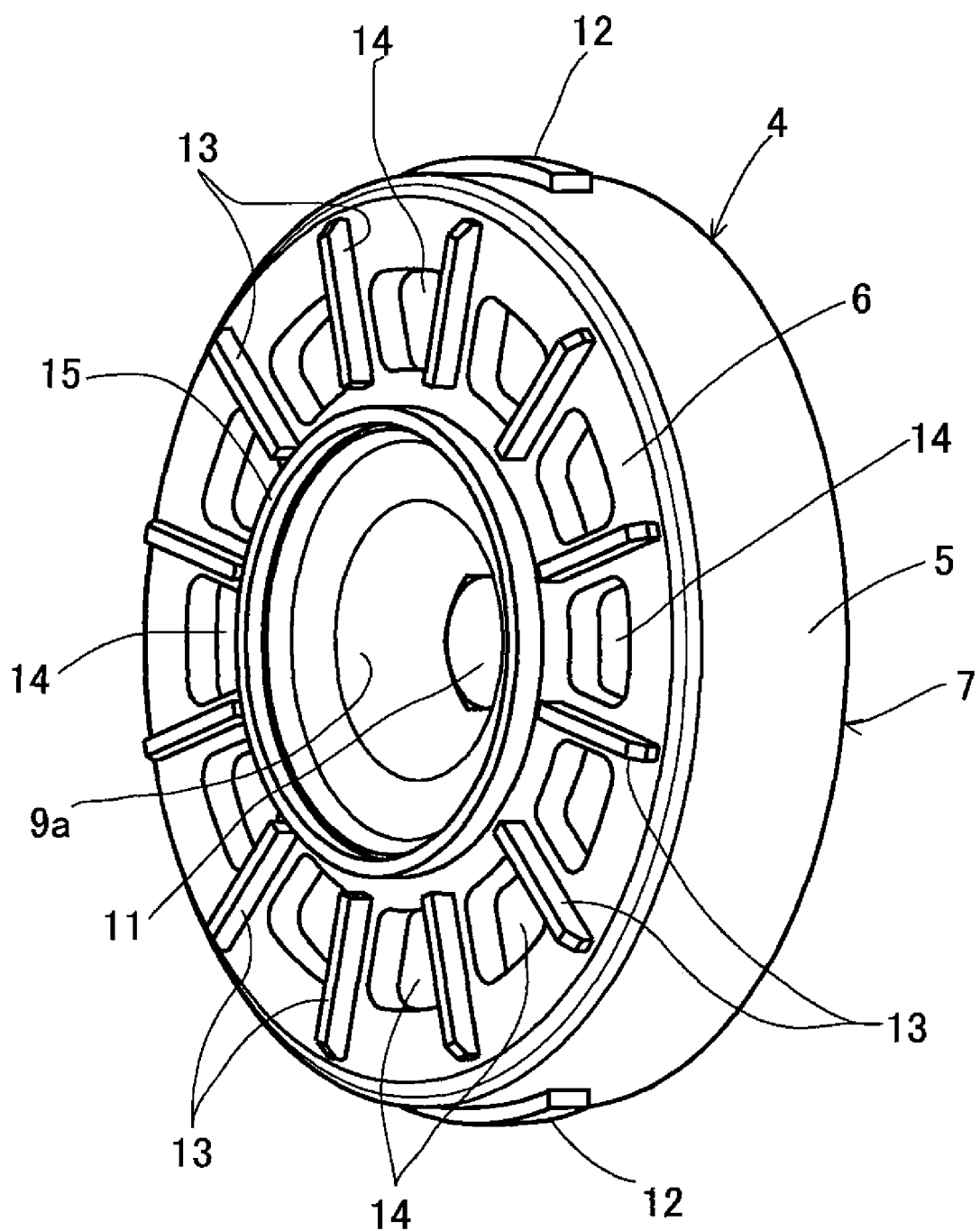
FIG. 3 is a perspective view showing a rotor yoke used in the first embodiment.

As shown in FIGS. 2 and 3, on an outer surface of a portion close to the outer periphery of the bottom wall portion 6 of the rotor 4 (a portion connecting the cylindrical portion 9a and the peripheral wall portion 5), a large number of fins 13 are provided so as to be arranged radially along the circumferential direction of the rotor yoke 7. A large number of vent holes 14 are formed so as to be arranged in the circumferential direction of the rotor at positions adjacent to the fins 13, respectively. The vent holes 14 are formed so as to penetrate the bottom wall portion 6 of the rotor yoke, and it is constructed, by the large number of fans, a centrifugal fan which brings air inside of the rotor yoke 7 to the outer periphery side of the rotor yoke 7 through the vent holes when the rotor 4 rotates.

On the outer surface of the bottom wall portion of the rotor yoke 7, there are bonded an annular position detecting magnet 15 being magnetized so that a plurality of magnetic poles are circumferentially arranged at equal angular intervals. The magnet 15 configures, together with a magnetic sensor which is described later, a position detector for detecting rotational angle information of the rotor 4 when a starter generator is driven as a brushless motor. In this embodiment, the position detecting magnet 15 includes magnetic poles which number is the same as that of the rotor 4 and are magnetized so that the magnetic poles of the position detecting magnet 15 are circumferentially arranged in same order as the magnetic poles of the magnetic field of the rotor 4 consisting of the permanent magnets 8.

On an end surface of the crank case 2, it is provided an annular stator mounting peripheral wall portion 20, which is concentrically-surrounding the crankshaft 3 and protruded from the end surface of the crank case 2, and a stator bracket 21 composed of metal is fixed to the stator mounting peripheral wall portion 20. The stator bracket 21 comprises: an annular base plate 21a including a plate which is orthogonal to the axis of the rotor and has a larger outer diameter than the peripheral wall portion of the rotor yoke 7, in which a hole 22 concentrically surrounding the extended portion 9b of the boss 9 of the rotor yoke 7 is provided at the center of the annular base plate 21a; an inner peripheral wall portion 21b which is protruded from an inner peripheral portion of the base plate 21a to the rotor side and surrounds the extended portion 9b of the boss 9 of the rotor yoke 7; and an outer peripheral wall portion 21c which is protruded from the outer peripheral portion of the base plate 21a to the rotor side, at an outward position across the peripheral wall portion 5 of the rotor yoke 7. The base plate 21a of the stator bracket 21 is attached to, through an unshown gasket, an end surface of the annular stator mounting peripheral wall portion 20 which is provided on the crank case 2 of the engine. The stator bracket 21 is coupled to the crank case 2 by unshown bolts, which causes the stator bracket 21 to be connected to the stator mounting peripheral wall portion 20 in liquid-tight manner.

A stator 25 is attached to the stator bracket 21. The stator 25 comprises: a well-known multi-pole annular armature core 26 formed of steel laminates and having a large number of salient pole portions 26b being radially-protruded from an outer periphery of an annular yoke 26a; and multiple-phase armature coils 27 being constructed by multiple-phase connection of coils wound around a series of salient pole portions of the armature core 26. An armature core fitting portion having a step is formed by cutting a predetermined amount of an outer periphery of a portion closed to a tip of the inner periphery portion 22 of the stator bracket 21, and a stator 25 is positioned with respect to a radial direction and axial direction of the rotor 4 by fitting the armature core fitting portion into the inner periphery of the yoke 26a of the armature core 26 of the stator 25. The stator being positioned with respect to the rotor 4 is fastened to the stator bracket by bolts 28 which penetrate the yoke 26a of the armature core and are screwed into the inner peripheral part 22 of the stator bracket 21. On a tip of the salient pole portion 26b of the armature core 26 of the stator 25, a magnetic pole portion of the stator is formed, which is faced to a magnetic pole of the rotor 4 through air gap. In this embodiment, a number of phases of the armature coils is set 3.

A metal protecting cover 30 covering the rotor 4 together with the stator 25 is also connected to the stator bracket 21, and a rotor/stator containing space is provided inside of the protecting cover 30 for containing the rotor 4 and the stator 25 in liquid-tight manner.

The shown protecting cover 30 is formed into a cup-like shape having an end wall 31 facing the bottom wall portion 6 of the rotor yoke 7 and a cylindrical side wall portion 32 surrounding the peripheral wall portion 5 of the rotor yoke 7. The protecting cover 30 is arranged so that the rotor 4 and the stator 25 are contained inside of the cover, and a flange 33 formed at an opening end of the side wall portion 32 of the protecting cover is attached, through the unshown gasket, to the outer peripheral wall portion 21c of the stator bracket 21. Then, the flange 33 of the protecting cover and the outer peripheral wall portion of stator bracket 21 are screwed together by a unshown bolt to be fastened to the stator mounting peripheral wall portion 20 of the crank case, thus causing the protecting cover 30 to be connected to the engine in sealed condition in liquid-tight manner. The sealed rotor/stator containing space is formed between the protecting cover 30 and the crank case 2 of the engine, and the rotor 4 and the stator 25 are contained in the protecting cover 30 in liquid-tight manner. A grommet 35 is fit into a notch formed on a part of the outer peripheral wall portion 21c of the stator bracket 21, and then a wire harness H including leads (not shown) being drawn out from terminals of each phase of the armature coils 27 and leads 53 being drawn out from a magnetic sensor described later is drawn to outside through the grommet 35.

In order to increase a contacting area between the end wall 31' of the protecting cover 30 and air inside of the protecting cover, there are formed a large number of columnar protrusions being arranged decentrally on the inner surface of the end wall of the protecting cover, and a large number of heat radiation fins 39 extending in axial direction of the side wall portion are formed on an inner periphery of the side wall portion 32 of the protecting cover 30 so as to be arranged in the circumferential direction of the side wall portion.

Instead of the columnar protrusions, a large number of heat radiation fins may be formed on the end wall 31 of the protecting cover 30. In order to make air flow occur smoothly through a space between the side wall portion of the protecting cover 30 and the peripheral wall portion of the rotor yoke 7, it is preferable to form, on the inner periphery of the side wall portion of the protecting cover 30, a large number of heat radiation fins extending in the axial direction of the protecting cover and arranged in circumferential direction as shown in the drawing. However, a large number of protrusions may be formed instead of these heat radiation fins.

On a part of the side wall portion 32 of the protecting cover 30, a boss 40 is formed so as to protrude in the radial direction of the protecting cover, and a pulse generator 41 is mounted so as to penetrate the boss 40. The pulse generator 41 detects edges of the inducer 12 and generates pulse signals. The pulse generator 41 is a well-known type which comprises a core having a magnetic pole portion opposed to the inducer 12 on a tip of the core, permanent magnets being magnetically coupled to the core, and a signal coil wound around the core. When the inducer 12 starts and finishes opposing to the magnetic pole portion of the core of the pulse generator 41, the signal coil of the pulse generator 41 generates a pair of pulses, having different polarities according to the change of magnetic flux being generated in the core. The pulses generated by the pulse generator 41 are used for detecting a rotational speed of the engine. The pulses generated by the pulse generator 41 are also used as signals for setting timings for the measurements of ignition positions of the engine which are arithmetically operated with respect to the rotational speed of the engine or as signals for setting timings for starting fuel injection.

A recessed portion 46 for positioning the magnetic sensor 45 by fitting is formed on an inner side of a part closed to the outer periphery of the end wall 38 of the protecting cover 30, and a screw hole for screwing a screw 48 to secure the magnetic sensor to the protecting cover 30 is provided at a protrusion 47 being formed on the outer side of the bottom wall portion of the recess 46.

Figure 4:
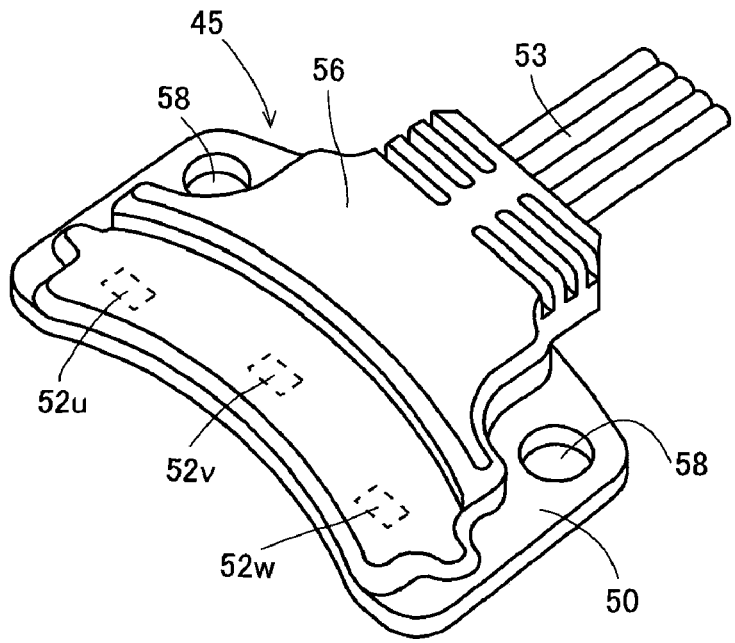
FIG. 4 is a perspective view showing a magnetic sensor used in the first embodiment.
Figure 5:
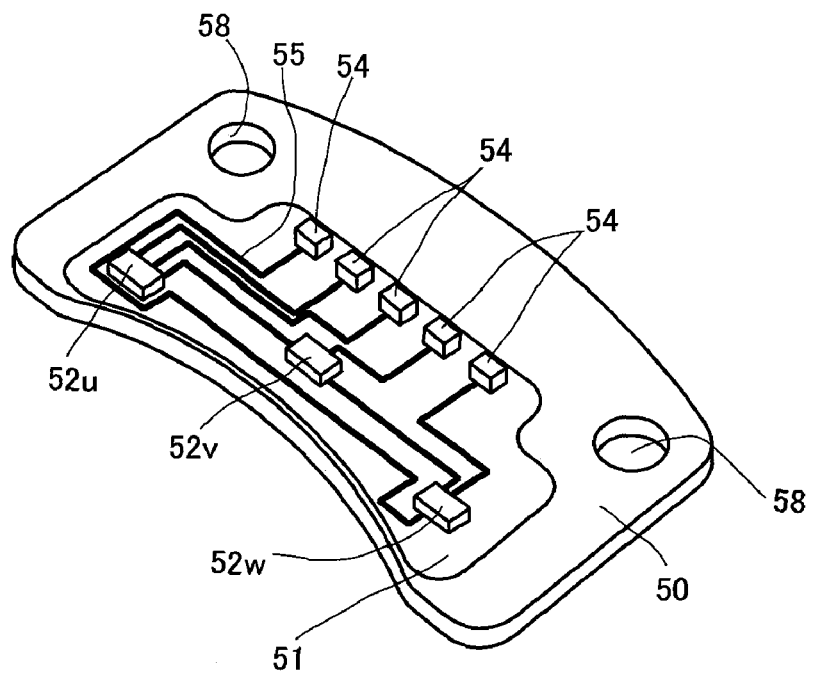
FIG. 5 is a perspective view showing a base plate of the magnetic sensor and electric parts such as Hall elements mounted on the base plate, used in the first embodiment.

As shown in FIGS. 4 and 5, the magnetic sensor 45 comprises a metal base plate 50, on which a thin insulating layer 51 is formed. On the insulating layer 51, it is provided three-phase Hall sensors 52u to 52w being provided with respect to the three-phase armature coils, respectively, and connectors 54, to which the leads 53 for connecting the Hall sensors 52u to 52w to outside circuits are connected. On the thin insulating layer 51 formed on a surface of the metal base plate 50, a wiring pattern 55 is also formed to connect between the Hall sensor 52u to 52w and the connectors 54. On the metal base plate 50, an insulating cover 56 which covers parts in which the Hall sensor 52u to 52w and the wiring pattern 55 are provided is formed so as to integrate with the metal base plate, and the leads 53 being connected to the connectors 54 are drawn out from the insulating cover 56 to outside. The insulating cover 56 is provided so as not to cover a back surface of the metal base plate, and mounting holes 58 are formed at both end position of the metal base plate 50 which is away from the insulating cover 56.

The magnetic sensor 45 is arranged so as to be thermally coupled to the end wall of the protecting cover by making the metal base plate 50 fit to the recess 46 of the end wall 31 of the protecting cover to cause the back surface of the metal base plate 50 to directly contact with the bottom surface of the recess 46 or to contact with the bottom surface of the recess 46 through a thermally-conductive layer consisting of thermally-conductive materials. Then, the magnetic sensor 45 is secured to the end wall 31 of the protecting cover 30 by screwing the screw 48 penetrating the mounting holes 58 into the screw hole being provided on the protrusion 47 formed on the end wall of the protecting cover 30. The aforementioned thermally-conductive layer can be formed by paste consisting of thermally-conductive resin such as silicon or double-stick tape consisting of silicon.

The Hall sensors 52u to 52w are positioned along the circumferential direction of the position detecting magnets 15 being attached to the bottom wall portion of the rotor yoke 7, in the state where the magnetic sensor 45 is attached to the end wall of the protecting cover 30 as described above, so as to be arranged in detecting positions being set with respect to each three-phase armature coil. Each phase of Hall sensors outputs rectangular wave-like detecting signals including rotational angle information of the rotor 4, by detecting polarities of the magnetic poles of the position detecting magnet 15 through an air gap at the detecting position.

The leads 53 constitutes a wire harness H together with leads drawn out from the armature coils, and the wire harness H is send out to outside through the grommet 35. The wire harness H is connected to a starter generator driving control device (unshown) being provided outside of the starter generator. The starter generator driving control device comprises a well-known three-phase bridge type inverter circuit in which: each side of bridge is consisted of a semiconductor switch and diode being anti-parallelly-connected to each semiconductor switch; DC terminal of the inverter circuit is connected to a battery; and AC terminal side of the inverter circuit is connected to the three-phase armature coils, and a controller which on-off controls each semiconductor switch of the inverter circuit. At the start of the engine, the controller drives the starter generator as a brushless motor to cause the starter generator to perform cranking of the engine, by controlling the inverter circuit so as to flow driving currents into the three-phase armature coil 27 in accordance with excitation pattern being determined based on the rotational angle position information of the rotor obtained from outputs of the Hall sensors 52*u* to 52*w*.

After the engine starts, the starter generator is driven by the engine and operates as a magnet-type AC generator. At this time, the above controller on-off controls switch elements of the inverter circuit so that a charging voltage being applied from the generator to the battery through full-wave rectifier circuit consisting of the diode on each side of the bridge of the inverter circuit is kept within a predetermined range.

Figure 6:
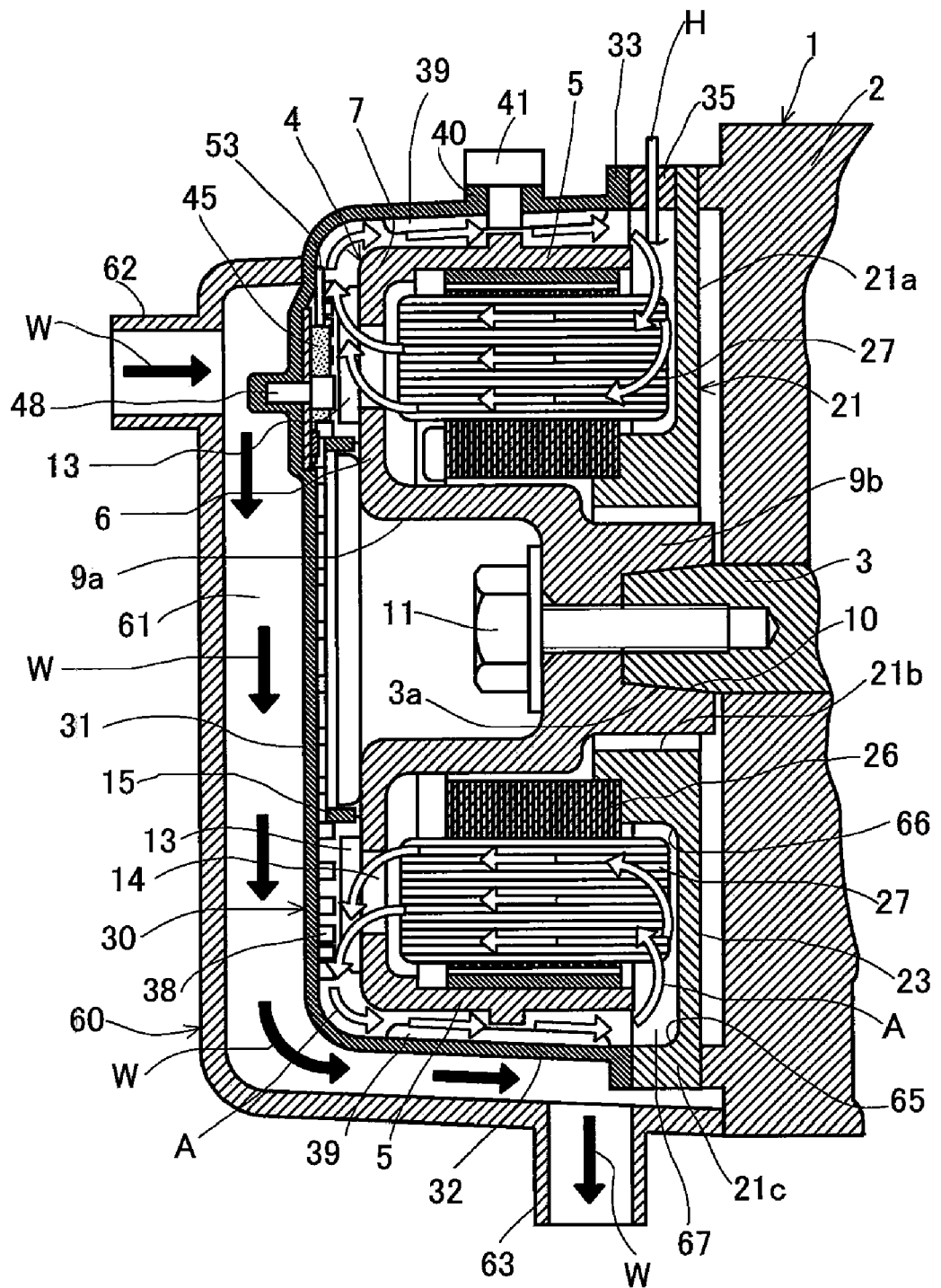
FIG. 6 is a vertical sectional view showing air flow and cooling water flow generated in the starter generator according to the first embodiment.

In this embodiment, a metal water cover 60 is mounted so as to cover from outside at least a part of the end wall 31 of the protecting cover 30 and at least a part of the side wall portion of the protecting cover 30. The water cover 60 is welded on the protecting cover 30, and a cooling water passage 61 to which cooling water of the engine is introduced is formed between the water cover 60 and the protecting cover. On the water cover 60, there are provided a connecting pipe 62 which constitutes a cooling water introducing port for introducing cooling water to the cooling water passage 6 and a connecting pipe 63 which constitutes a cooling water sending port from which the cooling water inside of the cooling water passage 61 is led out. With these connecting pipes being connected a radiator of the engine through an unshown pipe, cooling water W of the engine is flowed into the cooling water passage 61 as shown in FIG. 6.

On a border between the outer peripheral wall portion 21*c* and the base plate 21*a* of the stator bracket 21 and a border between the inner peripheral wall portion 21*b* and the base plate 21*a* of the stator bracket 21, it is formed curved guide surfaces 65 and 66 which guide air A being sent to the outer peripheral side of the rotor yoke by the centrifugal fan consisting of the fans 13 so that the air is flowed to the stator bracket side through a gap between the side wall portion 32 of the protecting cover and the peripheral wall portion 5 of the rotor yoke 7 and is flowed into the inside of the rotor yoke 7. With these guide surfaces and a portion between the outer peripheral wall portion 21*c* and the inner peripheral wall portion 21*b*, an air flow guide portion 67 is formed which flows, into the inside of the rotor yoke 7, the air A flowing to the stator bracket side through a portion between the side wall portion 32 of the protecting cover 30 and the peripheral wall portion 5 of the rotor yoke 7.

The starter generator according to this embodiment of the present invention is driven as a brushless motor by being energized from the battery to the predetermined-phase armature coil 27, following to the excitation pattern determined in accordance with the rotational angle position information of the rotor 4 detected by the magnetic sensor 45, at the start of the engine, and operates as a starter motor for performing cranking of the engine 1. The starter generator also is driven by the engine, after the start of the engine 1, to operate as a magneto generator, in which AC voltage induced to the armature coil 27 is rectified and adjusted to be supplied to the battery and a load across the battery.

In this embodiment, since the fans 13 and the vent holes 14 are provided on the bottom wall portion of the rotor yoke in order to construct the centrifugal fan for drawing out air inside of the rotor yoke to send the air to the outer peripheral side of the rotor yoke 7, the air A inside of the rotor yoke 7 which is heated by the armature coil 27 is sent to the outer peripheral side of the rotor yoke by the centrifugal fan as shown in outlined arrows, and flows to the stator bracket side through a gap between the side wall portion 32 of the protecting cover 30 and the peripheral wall portion 5 of the rotor yoke 7. Thus, it is possible to constantly cause, inside of the protecting cover, the air flow which returns from the opening portion of the rotor yoke 7 into the rotor yoke, after passing from the inside of the rotor yoke 7 to the gap between the rotor yoke 7 and the protecting cover 30 through the vent holes 14. When such an air flow is constantly caused, the air A heated by the heat from the armature coil 27 and flowed out through the vent hole 14 is cooled by thermal exchange with the cooling water W inside of the cooling water passage 61, in the process of flowing while contacting with the end wall portion 31 and side wall portion 32 of the protecting cover 30. Since the cooled air is changed its direction by the air flow guiding portion 67 to flow into the rotor yoke 7 and absorbs the heat from the armature coil 27 again, it is possible to efficiently cool the armature coil 27 and prevent the temperature of the armature coil from increasing. Thus, according to the present invention, without interfering with the cooling of the armature coil, the starter generator body comprising a rotor and a stator being arranged inside of the rotor can be contained in the sealed casing to achieve the waterproof property and mechanical protection of the starter generator body.

In the above embodiment, since the Hall sensors 52*u* to 52*w* consisting of the magnetic sensor 45 is attached on the metal base plate 50, and the metal base plate 50 is thermally connected to the part of end wall of the protecting cover 30 which contacts with the cooling water passage 61, the Hall sensors can be efficiently cooled to certainly prevent the temperature of the Hall sensors from exceeding the usable range.

When a large number of protrusions or heat radiation fins are formed on the inner surface of the end wall 31 and the inner periphery of the side wall portion 32 of the protecting cover 30, the contacting area of the side wall portion 32 of the protecting cover with air flowing through the vent hole 14 of the rotor yoke 7 can be increased, and also the contacting area of the side wall portion 32 of the protecting cover 30 with air flowing through the gap between the side wall portion 32 of the protecting cover and the peripheral wall portion 5 of the rotor yoke can be increased. Therefore, the thermal exchange performed between air being led out from inside of the rotor yoke and cooling agents outside of the protecting cover 30 can be enhanced to increase the cooling efficiency of the starter generator.

In the above embodiment, although the water cover 60 is formed so as to cover at least a part of the end wall 31 and at least a part of the side wall portion of the protecting cover 30 to form the cooling water passage 61 contacting with at least a part of the end wall 31 and at least a part of the side wall portion of the protecting cover, the present invention is not limited to such a construction. For example, as shown FIG. 7, cooling of armature coils of a starter generator may be performed by forming a large number of heat radiation fins 70 on an outer surface of an end wall 31 of a protecting cover 30 to enhance thermal exchange performed between air inside of the protecting cover 30 and air outside of the protecting cover 30.

Figure 7:
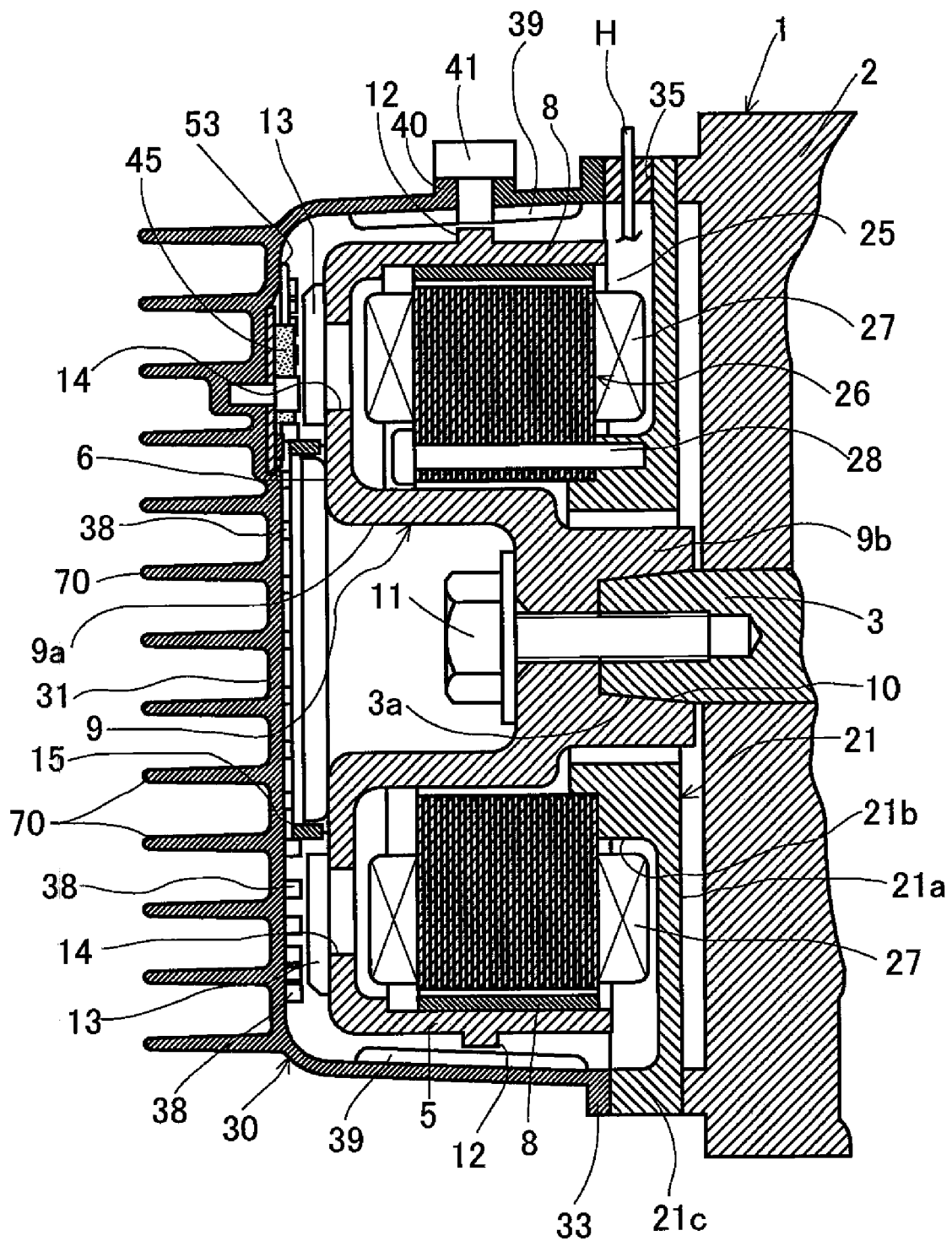
FIG. 7 is a vertical sectional view showing a starter generator according to another embodiment of the present invention.

Although it is not shown in FIG. 7, a large number of heat radiation fins may be formed also on the outer surface of the side wall portion 32 of the protecting cover 30.

In the above embodiment, the sealed rotor/stator containing space for containing the rotor 4 and the stator 25 is formed inside of the protecting cover, by fastening the protecting cover 30 with the crankcase 2 together with the stator bracket 21 and connecting the protecting cover 30 to the engine in liquid-tight manner, while providing gasket between the opening end of the side wall portion of the protecting cover and the outer peripheral wall portion 21c of the stator bracket 21 and between the base plate 21a of the stator bracket 21 and the end surface of the stator mounting peripheral wall portion 20 of the crankcase 2, respectively. However, what is required in this invention is to contain the rotor 4 and the stator 25 into the protecting cover in liquid-tight manner; therefore, a structure for attaching the protecting cover is not limited to the above-described example. For example, by fastening the opening end of the side wall portion 32 of the protecting cover 30 directly to the crankcase 2 so as to be sealed in liquid-tight manner, the sealed rotor/stator containing space to contain the rotor and the stator may be constructed inside of the protecting cover.

Although the preferred embodiments of the invention have been described and illustrated with reference to the accompanying drawings, it will be understood by those skilled in the art that there are by way of examples, and that various changes and modifications may be made without departing from the spirit and scope of the invention, which is defined only to the appended claims.

What is claimed is:

1. A starter generator which operates as a brushless motor at start of an engine to drive a crankshaft of the engine in order to start the engine and is driven by the engine after the starting operation of the engine is completed to operate as a magneto generator, which comprises:

a rotor which includes a rotor yoke having a peripheral wall portion and a bottom wall portion closing one axial end of said peripheral wall portion, permanent magnets being attached on an inner peripheral of the peripheral wall portion of said rotor yoke, and in which a boss portion to be connected to a crankshaft of said engine is provided at a center of the bottom wall portion of the rotor yoke;

a stator bracket to be fixed to a case of said engine;

a stator having an armature core and a multi-phase armature coil wound around said armature core and being arranged inside of the rotor, in which the armature core is fixed to the stator bracket; and a protective cover having an end wall portion which is opposed to the bottom wall portion of the rotor yoke and a cylindrical side wall portion surrounding said peripheral wall portion of the rotor yoke, said protective cover being fixed to said engine so as to be sealed in liquid-tight manner with respect to said engine, in which a rotor/stator containing space for containing said rotor and stator is formed, wherein:

a plurality of fans arranged so as to be arrayed in circumferential direction of the rotor yoke are formed on an outer surface of a portion close to the outer periphery of the bottom wall portion of the rotor yoke;

each vent hole which penetrates the bottom wall portion of the rotor yoke is formed at a position adjacent to the fan, respectively, and a centrifugal fan for leading air inside of the rotor yoke out through the vent holes and sending the air to the outer peripheral side of the rotor yoke is constituted by said fans; and a guide surface is provided on the stator bracket, which guides, into the inside of the rotor yoke, said air being sent to the outer peripheral side of the rotor yoke by the centrifugal fan and flowed to the stator bracket side through a gap between the side wall portion of the protective cover and the peripheral wall portion of the rotor yoke.

2. The starter generator according to claim 1, wherein a large number of protrusions or radiating fins are formed on an inner surface of the end wall portion of the protective cover and an inner periphery of the side wall portion of the protective cover.

3. The starter generator according to claim 1, wherein a water cover is provided so as to cover at least a part of the end wall portion of the protective cover and at least a part of the side wall portion of the protective cover, and a cooling water passage in which cooling water of the engine is passed is formed between the water cover and the protective cover, so as to lead cooling water of the engine into the cooling water passage.

4. The starter generator according to claim 3, wherein a large number of protrusions or radiating fins are formed on an inner surface of the end wall portion of the protective cover which contacts to the cooling water passage and on an inner periphery of the side wall portion of the protective cover which contacts to the cooling water passage.

5. The starter generator according to claim 1, wherein a position detecting magnet is mounted to the outer surface of the rotor yoke, said position detecting magnet being magnetized so as to have magnetic poles which number is the same as that of the rotor and are arrayed in circumferential direction of the rotor at equal angular intervals, a magnetic sensor which detects a polarity of the magnetic poles of the position detecting magnets and outputs signals including rotational angle position information of the rotor is attached so as to be thermally coupled to an inner surface of the end wall portion of the protective cover, and a drive control device is provided which is constructed so as to drive said starter generator as a brushless motor at the start of the engine by supplying drive current to the armature coil according to the exiting pattern decided based on the rotational angle position information of the rotor detected by the magnetic sensor.

6. The starter generator according to claim 5, wherein said magnetic sensor comprises a metal base plate and Hall sensors mounted to the metal base plate, said magnetic sensor is mounted to the inner surface of the end wall portion of said protective cover so that said metal base plate is thermally coupled to the end wall portion of the protective cover which contacts to the cooling water passage.

7. A starter generator which operates as a brushless motor at start of an engine to drive a crankshaft of the engine in order to start the engine and is driven by the engine after the starting operation of the engine is completed to operate as a magneto generator, which comprises:

a rotor which includes a rotor yoke having a peripheral wall portion and a bottom wall portion closing one axial end of said peripheral wall portion, permanent magnets being attached on an inner peripheral of the peripheral wall portion of said rotor yoke, and in which a boss portion to be connected to a crankshaft of said engine is provided at a center of the bottom wall portion of the rotor yoke;

a stator bracket being fixed to a case of said engine;

a stator having an armature core and a multi-phase armature coil wound around said armature core and being arranged inside of the rotor, in which the armature core is fixed to the stator bracket; and a protective cover having an end wall portion which is opposed to the bottom wall portion of the rotor yoke and a cylindrical side wall portion surrounding said peripheral wall portion of the rotor yoke, said protective cover being fixed to said engine so as to be sealed in liquid-tight manner with respect to said engine, in which a rotor/stator containing space for containing said rotor and said stator is formed, wherein:

a plurality of fans arranged so as to be arrayed in circumferential direction of the rotor are formed on an outer surface of a portion close to the outer periphery of the bottom wall portion of the rotor yoke;

each vent hole which penetrates the bottom wall portion of the rotor yoke is formed at a position adjacent to the fan, respectively, and a centrifugal fan for leading air inside of the rotor yoke out through the vent holes and sending the air to the outer peripheral side of the rotor yoke is constituted by said fans; and a guide surface is provided on the stator bracket, which guides, into the inside of the rotor yoke, said air being sent to the outer peripheral side of the rotor yoke by the centrifugal fan and flowed to the stator bracket side through a gap between the side wall portion of the protective cover and the peripheral wall portion of the rotor yoke, and wherein:

said stator bracket includes: a base plate portion having a plate surface being orthogonal to an axis of the rotor and an outer diameter which is larger than that of the peripheral wall portion of the rotor yoke, in which a hole concentrically surrounding the boss portion of the rotor yoke is provided at a center of the base plate; an annular inner peripheral wall portion which protrudes from an inner peripheral portion of said base plate portion to the rotor side and surrounds the boss portion of the rotor yoke; an outer peripheral wall portion which protrudes from an outer peripheral portion of the base plate portion to the rotor side at an outward position across the peripheral wall portion of said rotor yoke, said base plate being constituted so as to be connected, in liquid tight manner, to an end surface of a stator mounting peripheral wall portion provided on a case of the engine, said stator is fixed to the inner peripheral wall portion of the stator bracket, said protective cover is fixed to the stator bracket so that an open end of the side wall portion of the protective cover is abutted to the end surface of the outer peripheral wall portion of the stator bracket, and said guide surface is formed at a boundary portion between the outer peripheral wall portion and the base plate of the stator bracket.

8. The starter generator according to claim 7, wherein a large number of protrusions or radiating fins are formed on an inner surface of the end wall portion of the protective cover and an inner periphery of the side wall portion of the protective cover.

9. The starter generator according to claim 7, wherein a water cover is provided so as to cover at least a part of the end wall portion of the protective cover and at least a part of the side wall portion of the protective cover, and a cooling water passage in which cooling water of the engine is passed is formed between the water cover and the protective cover, so as to lead cooling water of the engine into the cooling water passage.

10. The starter generator according to claim 9, wherein a large number of protrusions or radiating fins are formed on an inner surface of the end wall portion of the protective cover which contacts to the cooling water passage and on an inner periphery of the side wall portion of the protective cover which contacts to the cooling water passage.

11. The starter generator according to claim 7, wherein a position detecting magnet is mounted to the outer surface of the rotor yoke, said position detecting magnet being magnetized so as to have magnetic poles which number is the same as that of the rotor and are arrayed in circumferential direction of the rotor at equal angular intervals, a magnetic sensor which detects a polarity of the magnetic poles of the position detecting magnet and outputs signals including rotational angle position information of the rotor is attached so as to be thermally coupled to an inner surface of the end wall of the protective cover, and a drive control device is provided, which is constructed so as to drive said starter generator as a brushless motor at the start of the engine by supplying drive current to the armature coil according to the exiting pattern decided based on the rotational angle position information of the rotor detected by the magnetic sensor.

12. The starter generator according to claim 11, wherein said magnetic sensor comprises a metal base plate and Hall sensors mounted to the metal base plate, said magnetic sensor is mounted to the inner surface of the end wall portion of said protective cover so that said metal base plate is thermally coupled to the end wall portion of the protective cover which contacts to the cooling water passage.

* * * * *